(12) United States Patent
Veloso et al.

(10) Patent No.: US 9,132,889 B2
(45) Date of Patent: Sep. 15, 2015

(54) PANEL SUPPORTING DEVICE

(75) Inventors: Manuel Veloso, Hem (FR); Alexis Gaveau, Hem (FR)

(73) Assignee: CIEL ET TERRE INTERNATIONAL, Hellemmes-Lillie (FR)

( * ) Notice: Subject to any disclaimer, the term of this patent is extended or adjusted under 35 U.S.C. 154(b) by 39 days.

(21) Appl. No.: 14/111,826

(22) PCT Filed: Apr. 10, 2012

(86) PCT No.: PCT/EP2012/056425
§ 371 (c)(1),
(2), (4) Date: Nov. 4, 2013

(87) PCT Pub. No.: WO2012/139998
PCT Pub. Date: Oct. 18, 2012

(65) Prior Publication Data
US 2014/0224165 A1    Aug. 14, 2014

(30) Foreign Application Priority Data
Apr. 15, 2011 (FR) ...................... 11 01189

(51) Int. Cl.
*B63B 7/00* (2006.01)
*F24J 2/52* (2006.01)
*H01L 31/042* (2014.01)
*F24J 2/46* (2006.01)
*H02S 20/24* (2014.01)

(52) U.S. Cl.
CPC . *B63B 7/00* (2013.01); *F24J 2/526* (2013.01); *F24J 2/5237* (2013.01); *F24J 2/5267* (2013.01); *H02S 20/00* (2013.01); *F24J 2/4621* (2013.01); *F24J 2002/4663* (2013.01); *H02S 20/24* (2014.12); *Y02B 10/20* (2013.01); *Y02E 10/47* (2013.01); *Y02E 10/50* (2013.01)

(58) Field of Classification Search
CPC .......... B63B 35/00; B63B 3/08; B63B 35/38; B63B 7/00; B63B 35/44; H01L 31/042; H01L 31/0422; H01L 31/052
USPC .................... 114/266, 267; 136/244, 246, 251
See application file for complete search history.

(56) References Cited

U.S. PATENT DOCUMENTS

2007/0234945 A1* 10/2007 Khouri et al. ................. 114/266
2010/0294340 A1   11/2010 Cunningham et al.
2011/0232727 A1    9/2011 Cangini et al.

FOREIGN PATENT DOCUMENTS

| DE | 20 2008 014174 | 1/2009 |
| DE | 10 2008 055627 | 5/2010 |
| DE | 10 2009 019548 | 11/2010 |
| EP | 1 833 098 | 9/2007 |
| EP | 2 299 499 | 3/2011 |
| JP | 02-31465 | 2/1990 |

(Continued)

OTHER PUBLICATIONS

International Search Report dated May 15, 2013, corresponding to PCT/EP2012/056425.

*Primary Examiner* — Lars A Olson
(74) *Attorney, Agent, or Firm* — Young & Thompson

(57) ABSTRACT

A device (1) for supporting a photovoltaic panel essentially includes a sealed plastic jacket (2), the plastic jacket (2) forming a lower wall (3), an upper wall (4), and four sidewalls (5, 6, 7, 8), the device including elements for securing a photovoltaic panel to the upper wall (4) of the plastic jacket.

27 Claims, 18 Drawing Sheets

(56) References Cited

FOREIGN PATENT DOCUMENTS

| | | |
|---|---|---|
| JP | 04-72681 | 3/1992 |
| JP | 2004-63497 | 2/2004 |
| JP | 2004-71965 | 3/2004 |
| JP | 2004-228263 | 8/2004 |
| WO | 2007/062278 | 5/2007 |
| WO | 2008-087969 | 7/2008 |
| WO | 2008-157201 | 12/2008 |
| WO | 2010-064105 | 6/2010 |
| WO | 2010/097406 | 9/2010 |
| WO | 2011/094803 | 8/2011 |

* cited by examiner

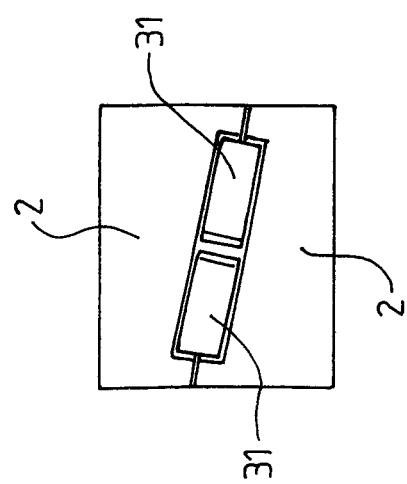

PANEL SUPPORTING DEVICE

BACKGROUND OF THE INVENTION

The invention relates to a device for supporting a photovoltaic panel, as well as system for supporting photovoltaic panels, resulting from the assembly of supporting devices in accordance with the invention, and of connecting elements.

The field of the invention is that of photovoltaic installations, and more particularly floating photovoltaic installations.

In the field of floating photovoltaic installations, floating devices for supporting photovoltaic panels are known, comprising a support structure, in the form of a metal frame, supporting one or several photovoltaic panels and means for floating, integral at the lower portion with the support structure, in the form of plastic floaters.

These floating devices, of complex structure, are intended to be manufactured in a workshop, then to be conveyed by lorry to the site of implementation.

The implementation of a floating photovoltaic installation, according to prior art, requires substantial logistics, not only for the carrying out of the floating devices, in the workshop, but also for conveying them to the site of implementation, then assembling them.

DESCRIPTION OF THE RELATED ART

It is known moreover from prior art, for example documents WO2010/097406 A2, EP 1833 098 A1, DE102009019548A1, DE10 2009 019548, DE 10 2008 055627 or again DE 20 2008 014174 devices for supporting solar panels that have a particular application for the installing of photovoltaic panels on roofs with horizontal surfaces. Each of these devices is comprised of a synthetic element in the form of a shell of which the base is intended to be fastened onto a horizontal surface, the shell having an upper inclined surface whereon the panel is intended to be fastened.

Such devices, conventionally obtained via thermoforming, are in the form of an open shell and are not suitable for a floating application. In particular, these devices do not constitute in any case floaters that are able to constitute a portion of a floating solar installation, able to resist heavy swell conditions, or inclement weather.

SUMMARY OF THE INVENTION

The purpose of this invention is to propose a device for supporting a photovoltaic panel with simplified structure in relation to prior art, which can be manufactured easily and at a low cost price.

In particular the purpose of this invention is to propose a floating device for supporting a photovoltaic panel, able to constitute an element of a floating solar installation.

Another purpose of this invention is to propose such a device that allows a framed or frameless panel to be fastened simply and at least cost.

Another purpose of this invention is to propose such a device that allows a large number of photovoltaic panels of the market to be fastened, and even in the case of differences in sizing between said panels.

Another purpose of this invention is to propose such a floating device, which facilitates the cooling of the panel, allowing for the aeration of the extent of water whereon the device is installed.

Another purpose of this invention is to propose a system for supporting photovoltaic panels, of easy implementation.

Another purpose of this invention is to propose such a system for supporting photovoltaic panels, able to resist heavy swell conditions, limiting splashing onto the photovoltaic cells of said panels, Another purpose of this invention is to propose such a system for supporting panels, of which the elements constituting the system—in particular devices and connecting elements—can be easily transported and stored.

Other purposes and advantages of this invention shall appear in the description which is provided only for the purposes of information and of which the purpose is in no way to limit it.

The invention also relates to a device for supporting a photovoltaic panel constituted mainly of a sealed plastic jacket, said plastic jacket constituting a lower wall, an upper wall, and four sidewalls, said plastic jacket able to enclose a volume of air allowing it to constitute a floater, with the device having means for maintaining a photovoltaic panel on said upper surface of said plastic jacket.

The plastic jacket of the device for supporting a panel can be manufactured by the techniques of roto-moulding or extrusion blow-moulding.

According to an advantageous embodiment, said means for maintaining include two elastomeric fastener profiles, fastened to said plastic jacket, said two fastener profiles extending parallel to each other, with each of the fastener profiles having a longitudinal slot intended for the pinching of the frame of a framed photovoltaic panel, or, intended for the pinching of a frameless photovoltaic panel, said longitudinal slots of the two fastener profiles extending according to the same plane parallel to the plane of the photovoltaic panel, said two fastener profiles being mutually separated in such a way as to allow for the fastening of a framed photovoltaic panel by pinching of two opposite edges of the frame, or again the fastening of a frameless photovoltaic panel, by pinching of two edges of the photovoltaic panel.

Such a fastening by elastomeric profiles allows for the maintaining of the panel, framed or frameless, by two of its opposite edges simply thanks to the friction between the elastomeric material of the profiles and that of the frame or of the panel.

This fastening by profiles is advantageous for several reasons. Firstly, this solution has a very lost cost price, as the profiles can be obtained via extrusion. Moreover, this solution is easy to install, as it does not require any tools for the fastening of the photovoltaic panel to the profiles, as the latter is simply pinched in said longitudinal slots.

Moreover, by providing longitudinal slots with overabundant depths, it is possible to take into account the dilatation of the panel or of the jacket of the device preventing as well the panel or its frame from abutting against the bottom of the two longitudinal slots, and without modifying the separation between the two elastomeric fastener profiles on the plastic jacket.

Furthermore and according to the other direction of the panel, parallel to the profiles, said panel can be provided as overhanging the fastener profiles, or even the jacket. The dimension of the panel in this direction no longer represents an assembly constraint.

Advantageously, according to an embodiment, each elastomeric fastener profile can include a groove of a form complementary to a fastening rib, in particular with a T-shaped section, of said plastic jacket of the device, said fastener profile being integral with said plastic jacket by slipping the fastening rib into said complementary groove of the elastomeric fastener profile.

This fastening rib of the jacket is preferably all in one piece with said sealed jacket of the device and can be obtained during the moulding of said plastic jacket, in particular by the techniques of roto-moulding or extrusion blow-moulding. As such, the fastening of each elastomeric fastener profile to the plastic jacket of the device can also be carried out, simply and without tools, by slipping the fastening rib into the complementary groove of the profile, with the maintaining of the fastener profile to the jacket being obtained simply thanks to the friction between the elastomeric material of the profile and the plastic material of the fastening rib.

According to another embodiment shown, said means for maintaining include, on the one hand, sliding means, protruding on said upper surface, able to cooperate in sliding with two opposite parallel edges of said photovoltaic panel, and on the other hand, means for abutment in such a way that the photovoltaic panel can be maintained on the upper surface of said plastic jacket, by sliding said photovoltaic panel between said sliding means until said photovoltaic panel comes into contact with said means for abutment.

Once inserted into said means for maintaining, the photovoltaic panel is substantially parallel to the upper wall of said jacket, blocked in the direction of sliding by the means for abutment. A locking element can be provided in order to block the sliding in the other direction.

The blocking of the panel in the direction perpendicular to the plane of the panel is obtained by said sliding means and the upper wall of the jacket, sandwiching the panel over its thickness.

Advantageously, according to an embodiment, said sliding means and said means for abutment are comprised of plastic elements all in one piece with said plastic jacket of said device and as such can be manufactured easily during the moulding of said plastic element, such as for example by the techniques of injection moulding, roto-moulding or extrusion blow-moulding.

According to an embodiment, said plastic jacket can have a recess intended for the aeration of said photovoltaic panel, said recess passing through said plastic jacket from said upper surface to said lower wall.

This recess makes it possible when the support device is used as an element of a floating installation, to facilitate the cooling of the photovoltaic panel by facilitating the heat exchanges between the water and the panel. Moreover, this recess makes it possible to facilitate the oxygenation of the surfaces of water covered by the device.

Alternatively or additionally, said plastic jacket can have at least one channel, extending in depth over the upper surface, intended for the aeration of said photovoltaic panel, said channel extending from a sidewall of said plastic jacket to the opposite sidewall of said plastic jacket. This channel has for function to facilitate the cooling of the photovoltaic panel, or moreover make it possible to run cables under the photovoltaic panel.

According to an embodiment, said lower wall and the upper wall of the jacket are not parallel to one another, mutually inclined by an angle $\alpha$. This angle can be between 10° and 30° or even between 10° and 14° and has for function to incline the photovoltaic panel in relation to the horizontal by said same angle when the device is resting on a horizontal surface by the intermediary of said lower wall.

In the case of said means for maintaining comprising said means for abutment and said sliding means, said upper wall of the plastic jacket has, when the device is resting on a horizontal surface by the intermediary of said lower wall, on the one hand, two edges, parallel to one another, each inclined by said angle $\alpha$ in relation to the horizontal, whereon are provided the sliding means, and on the other hand, two edges parallel to each other, each parallel to the horizontal, of which one is at a higher level authorising the introduction of the photovoltaic panel, and the other is at a lower level, having said means for abutment.

In the case of said means for maintaining comprising the two elastomeric fastener profiles intended to respectively pinch two opposite edges of the photovoltaic panel, framed or frameless, these two profiles can extend respectively along the lower and upper edges of the upper wall of the plastic jacket of the device.

According to an embodiment, said plastic jacket of said device can have an opening closed by a plug, making it possible to partially fill the interior volume of the plastic jacket. The filling of the sealed interior volume of the jacket makes it possible in particular, when said plastic jacket is used as a floater to change the floatability conditions of said jacket, or again when the device is used on a non-liquid surface, to ballast the device.

According to an embodiment, said plastic jacket of said device for supporting a panel can have fastening lugs on four corners of said plastic jacket. These lugs are, preferably, all in one piece with the plastic jacket, obtained during the moulding of said plastic jacket (i.e. roto-moulding or extrusion blow-moulding).

These lugs are preferably intended to cooperate with other lugs of neighbouring elements, the lugs being set against each other and locked together by means of pins.

According to an embodiment, at least two of the sidewalls of the plastic jacket are of concave shape, with the concavity of the sidewalls having for function to lessen the swell, as such limiting the splashing of water onto the photovoltaic cells of the panel.

The invention also relates to a system for supporting photovoltaic panels resulting from the assembly of devices for supporting photovoltaic panels in accordance with the invention and of connecting elements able to maintain two devices for supporting a panel.

Each connecting element is constituted substantially by a sealed plastic jacket, said plastic jacket of said connecting element constituting a lower wall, an upper wall, and four sidewalls, said plastic jacket having an interior volume making it possible to provide for the floating of said connecting element, said system having means for fastening for the assembling together of said connecting elements and of said devices for supporting photovoltaic panels in accordance with the invention.

According to an embodiment, the means for fastening include lugs for fastening the plastic jacket of the devices, as well as lugs for fastening the plastic jacket of the connecting elements, as well as pins, each pin being intended to simultaneously pass through two, or even three or four lugs set against each other in order to provide for the locking of the assembly.

According to another embodiment, said means for fastening can be constituted by means for clipping that are mutually engaging between each device for supporting a photovoltaic panel in accordance with the invention and each connecting element.

The means for clipping can advantageously be constituted of first plastic elements all in one piece with said plastic jacket of said device for supporting a panel in accordance with the invention and of second plastic elements all in one piece with said plastic jacket of said connecting element.

The attaching of a device for supporting a photovoltaic panel with a connecting element is then obtained by force fitting said first plastic elements with said second plastic elements.

Said system can have at least two rows of devices for supporting panels, in accordance with the invention, said two rows of devices being maintained by means of a row of connecting elements, able in particular to constitute a maintenance corridor.

According to an embodiment, two consecutive support devices belonging to the same row can be separated mutually by means of a connecting element, or even connecting elements in parallel, spacing the two devices. The separation between two consecutive devices makes it possible, for example, when the photovoltaic panels are provided as overhanging the plastic jackets to prevent collisions between panels.

According to an embodiment, the devices for supporting a photovoltaic panel in accordance with the invention and the connecting elements are modular elements.

According to an embodiment the plastic jacket of each of said connecting elements has an opening closed by a plug. This opening makes it possible to change the conditions of floatability of said connecting element via filling.

BRIEF DESCRIPTION OF THE DRAWING FIGURES

The invention shall be better understood when reading the following description along with the annexed drawings, wherein:

FIG. 1a is a side view of the device such as shown in FIG. 1;

FIG. 19 is a view of a block, particularly intended for the transport, substantially parallelepiped, resulting from the stacking on the one hand, of two plastic jackets of two devices in accordance with the invention, and on the other hand two plastic jackets of two connecting elements

DETAILED DESCRIPTION OF THE INVENTION

Figure 1:
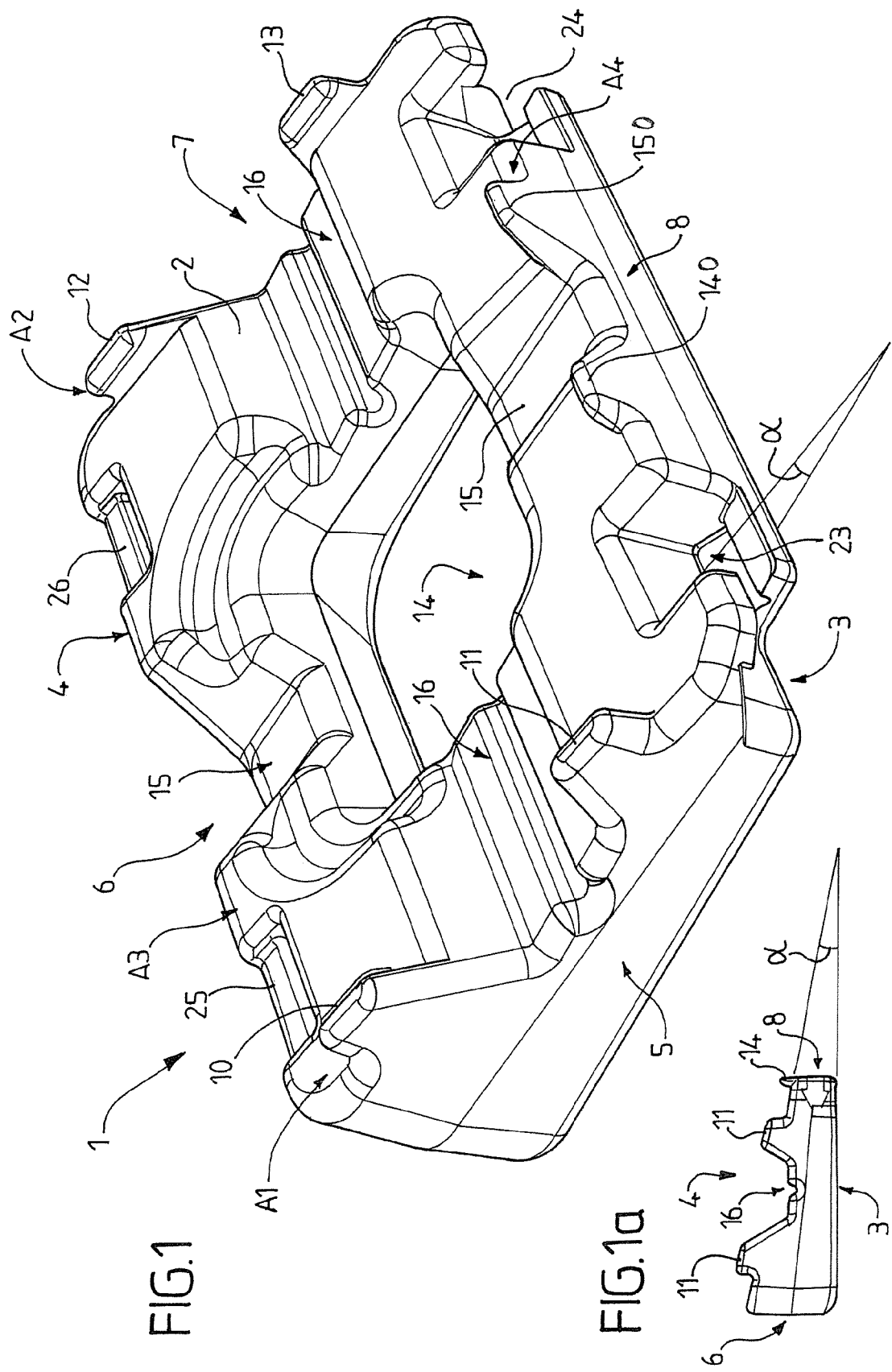
FIG. 1 is a perspective view of a device for supporting a photovoltaic panel in accordance with the invention according to a first embodiment.

Also the invention relates to a device 1 for supporting a photovoltaic panel constituted essentially of a sealed plastic jacket 2, said plastic jacket 2 constituting a lower wall 3, an upper wall 4, and four sidewalls 5, 6, 7, 8, the device having means for maintaining a photovoltaic panel on said upper surface 4 of said plastic jacket.

Said means for maintaining allow for the stable positioning of the photovoltaic panel abutting against the upper wall 4 of said plastic jacket 2, parallel to the plane of said upper wall 4. The surface or the frame of the panel can be directly abutting against the upper wall or indirectly by the intermediary of the means for maintaining.

The sealed plastic jacket 2 is able to enclose a volume of air allowing it to comprise a floater. Possibly, this jacket can have an opening 200 closed by a plug, in particular screwed. This plug can make it possible to partially fill the interior volume of said plastic jacket 2.

This arrangement will make it possible, when said plastic jacket 2 is used as a floater to change the conditions of floatability, or even decrease the sensitivity of the device to the winds. When the device is intended to be used on the ground or on a hard surface, the opening allows for the jacket to be filled, for example with sand, in order to ballast the device.

According to an embodiment, said means for maintaining are comprised of fastener elements, separate from the plastic jacket 2 of the device 1. For example, according to an embodiment shown in particular in FIGS. 12 to 16, said means for maintaining include two elastomeric fastener profiles 61, 62; 63; 64, fastened to said plastic jacket 2, said two fastener profiles 61, 62; 63; 64 extending parallel to each other.

Each of the fastener profiles has a longitudinal slot 65 intended for the elastic pinching of the frame C of a framed photovoltaic panel, or again, intended for the elastic pinching of a frameless photovoltaic panel.

Advantageously, said longitudinal slots 65 of the two fastener profiles 61, 62 or 63, 64 can extend in particular according to the same plane parallel to the plane of the photovoltaic panel, said two fastener profiles 61, 62; 63; 64 being separated mutually in such a way as to allow for the fastening of a photovoltaic panel.

Advantageously, the longitudinal slots 65 provide as such the blocking of the photovoltaic panel P solely thanks to said elastic pinching (of the photovoltaic panel or of its frame) and to the friction between, on the one hand, the elastomeric material of said fastener profiles 61, 62; 63; 64 and, on the other hand, the frameless photovoltaic panel P, or the frame C of the framed photovoltaic panel P.

Figure 15:
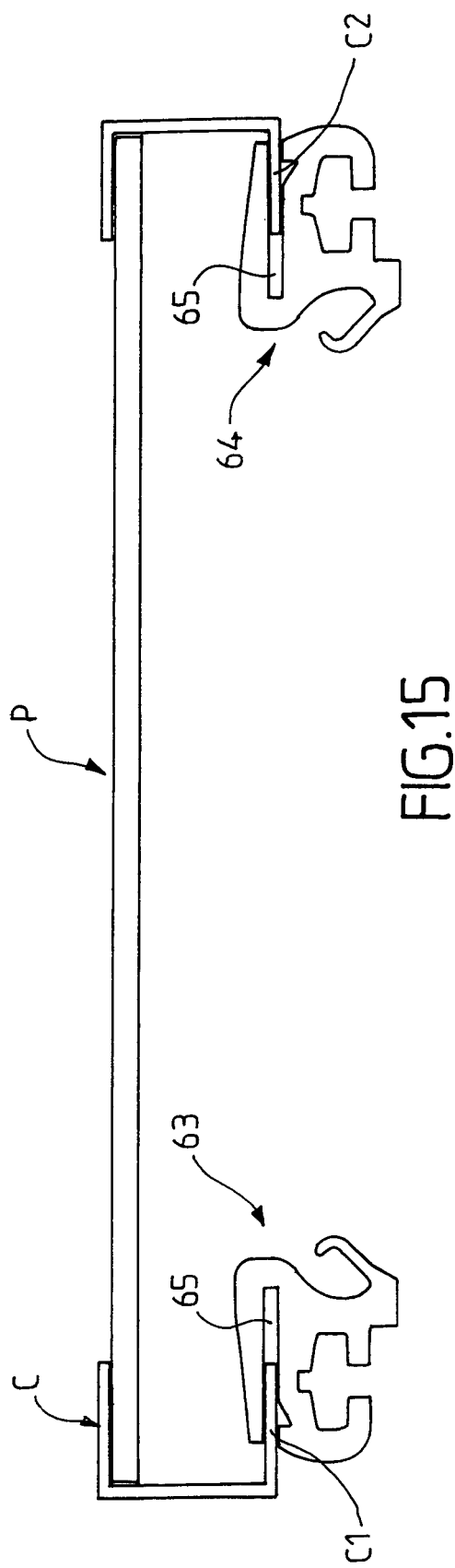
FIG. 15 is a view of the fastening of a framed photovoltaic panel, by two opposite and parallel edges of the frame of the panel, received respectively in the slots of two elastomeric fasteners.

For example, and according to the embodiment of FIG. 15, the two fastener profiles 63, 64 allow for the maintaining of a framed panel by elastic pinching of two opposite edges C1, C2 of the frame. The longitudinal slots 65 thus open outwards in order to respectively pinch two coplanar wings of the frame. Note in this embodiment that the elastomeric profiles 63, 64 are covered by the panel P, and as such protected from UV radiation.

Figure 16:
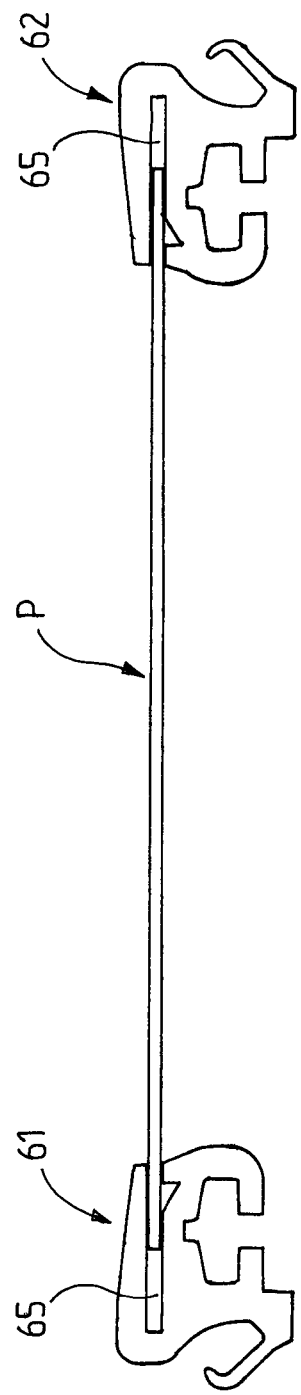
FIG. 16 is a view of the fastening of a frameless photovoltaic panel, by two opposite edges of said panel received respectively in the slots of two elastomeric fasteners.
Figure 17:
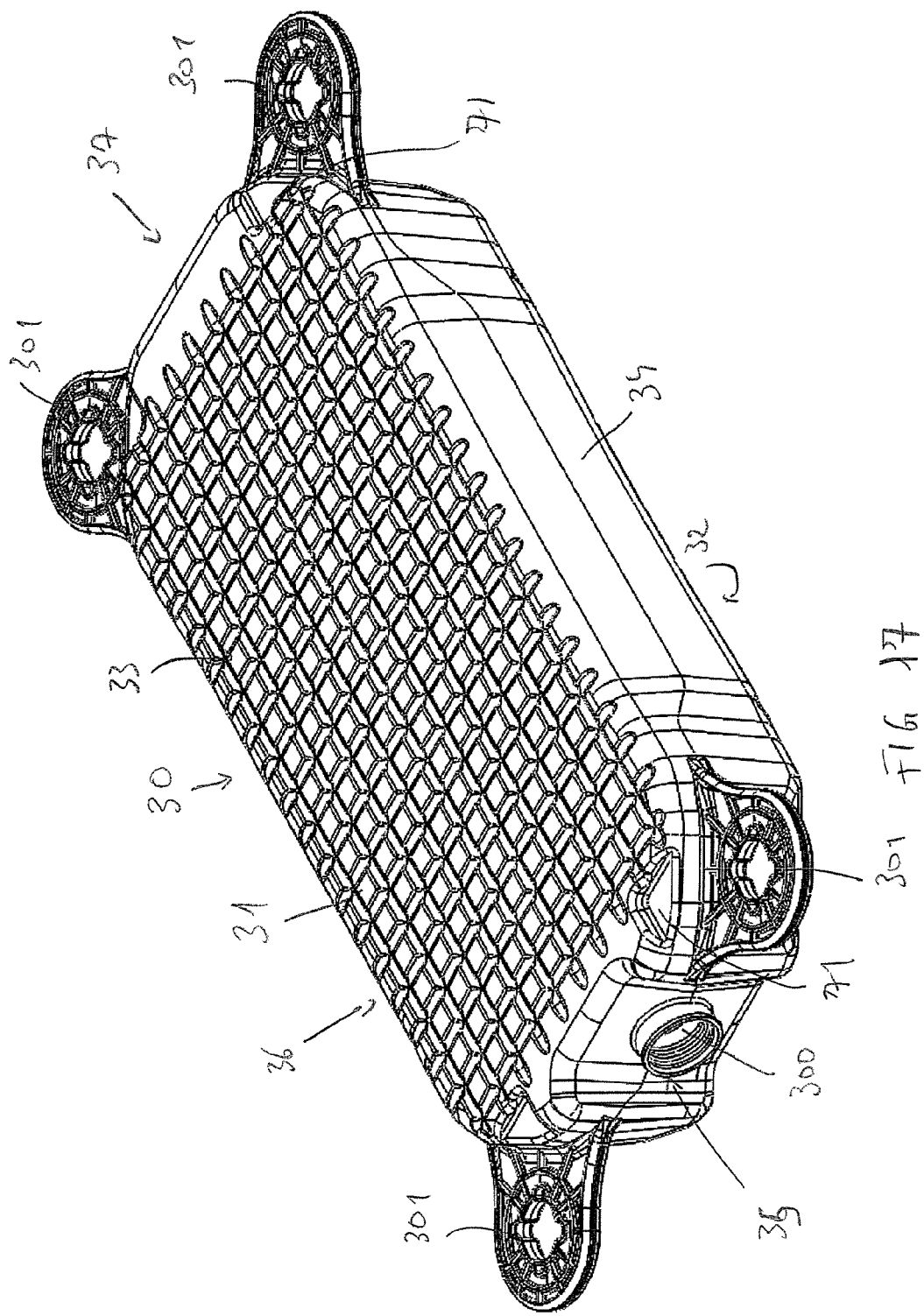
FIG. 17 and FIG. 18 are respectively perspective and side views of a connecting element of the system such as shown in FIG. 6.
Figure 18:
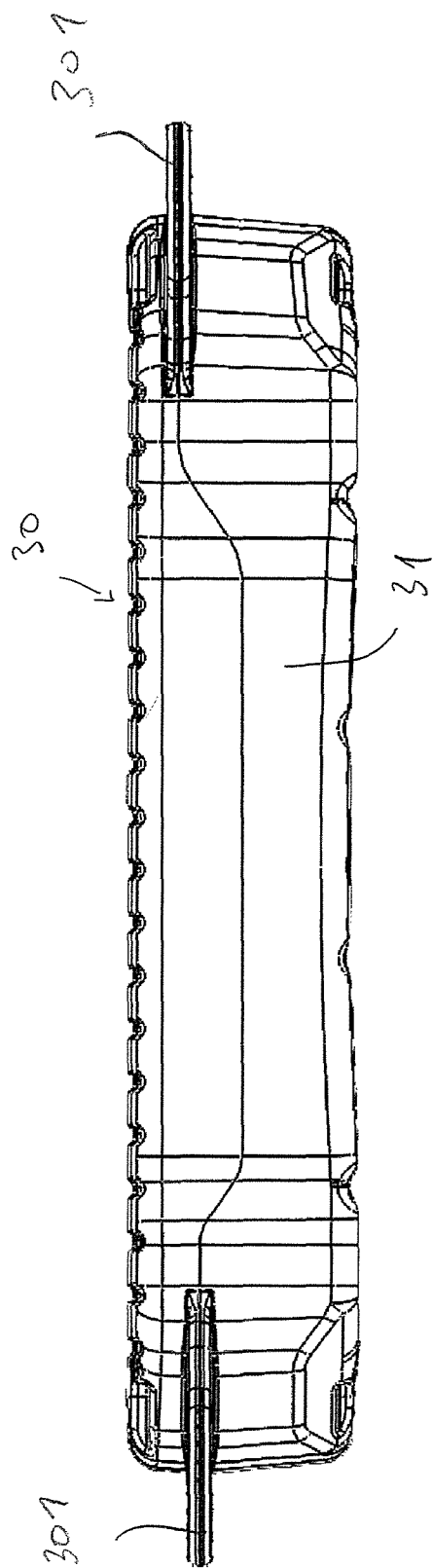

According to another embodiment shown in FIG. 16, the two fastener profiles 61, 62 allow for the maintaining of a frameless panel by elastic pinching of two edges of the photovoltaic panel. The longitudinal slots 65 open inwards allowing for the maintaining of a frameless photovoltaic panel.

The two fastener profiles 61, 62 or 63, 64 allow for the maintaining of the photovoltaic panel P, framed or frameless, by two of its edges only, the panel P being able to possibly extend beyond, in particular the profiles, on either side of said plastic jacket 2, according to a direction parallel to said profiles 61, 62; 63; 64, in particular overhanging said plastic jacket 2.

Advantageously, the depth of the longitudinal slots 65 can be overabundant, following a direction perpendicular to the profile and parallel to the plane of the panel, making it possible to take into account the phenomena of dilatation of the panel and/or of the jacket of the device, preventing as well the panel or its frame from abutting against the bottoms of the two fastener profiles.

Advantageously, according to an embodiment shown, each elastomeric fastener profile 61, 62; 63; 64 can comprise a longitudinal groove 68 with a form complementary to a fastening rib 66; 67 of said plastic jacket 2 of the device 1. The fastener profile is then made integral with said plastic jacket 2 by slipping the fastening rib into said complementary groove 68 of the elastomeric fastener profile.

The fastening rib 66; 67 can have a T-shaped section, in the form of a keyhole (disc combined with a trapeze) or any other shape that prohibits the withdrawal by pulling off of the elastomeric fastener profile from said fastening rib.

This fastening rib 66, 67 of the plastic jacket 2 is more preferably all in one piece with said plastic jacket 2 of the device 1 and can be obtained during the moulding of said plastic jacket 2, in particular by the techniques of roto-moulding or extrusion blow-moulding.

As such, the fastening of each elastomeric fastener profile to the plastic jacket of the device can also be carried out, simply and without tools, by slipping the fastening rib 66; 67 into the longitudinal groove 68, of complementary section. The maintaining of the fastener profile to the jacket according to the direction of the rib is obtained simply thanks to the friction between the elastomeric material of the profile and the plastic material of the fastening rib.

Possibly, the elastomeric fastener profile 61, 62 or 63, 64 can include, furthermore, a longitudinal groove 69 wherein electrical cables are intended to be run.

According to another embodiment, said means for maintaining are comprised of plastic elements all in one piece with said plastic jacket.

For example, said means for maintaining include, on the one hand, sliding means 10, 11, 12, 13, protruding on said upper surface 4, able to cooperate in sliding with two opposite parallel edges of said photovoltaic panel P, and on the other hand, means for abutment 140,150.

In this way, the photovoltaic panel P can be maintained on the upper surface 4 of said plastic jacket 2, by sliding said photovoltaic panel P between said sliding means 10, 11, 12, 13, in a direction parallel to the plane of said upper wall, until said photovoltaic panel P comes into contact with said means for abutment 140, 150.

Once inserted into said means for maintaining, the photovoltaic panel is substantially parallel to the upper wall of said jacket, blocked in the direction of sliding, in a first direction, by the means for abutment. A locking element (not shown) can be provided to block the sliding in a second direction, opposite to said first direction. For example the locking element can be an element screwed into a nut overmoulded internal to the wall of said plastic jacket 2. Once screwed, the element constitutes an abutment for the photovoltaic panel P in said second direction.

The blocking of the panel in the direction perpendicular to the plane of the panel is obtained by said sliding means and the upper wall of the jacket.

According to an embodiment shown, said sliding means 10, 11, 12, 13 and said means for abutment 140, 150 are constituted of plastic elements all in one piece with said plastic jacket 2 of said device 1.

For example, said sliding means are provided on two edges A1, A3 of said upper wall 4, parallel to each other. Said sliding means are comprised of elements 10, 11, 12, 13 in particular in the number of four. Each element 10, 11, 12, 13 extends protruding from the upper wall 4 and forms a groove intended to receive the edge of the photovoltaic panel P. In the figures, the elements are in the number of four, in a facing arrangement, two by two.

Said means for abutment are comprised on another edge A4 of the upper wall 4 of said plastic jacket 2. Said locking element, where applicable, is located on the last edge, marked as A3.

According to an embodiment shown, said plastic jacket 2 has:
  a recess 14 intended for the aeration of said photovoltaic panel, said recess 14 passing through said plastic jacket 2 from said upper wall 4 to said lower wall 3 and/or
  at least one channel 15, 16, extending in depth on the upper wall 4, intended for the aeration of said photovoltaic panel, said at least one channel 15, 16 extending from one sidewall of said plastic jacket 2 to the opposite sidewall of said plastic jacket.

For example, according to the example of the figures, said plastic jacket 2 has said recess 14, which extends over 20% to 50% of the upper surface of said jacket and two channels 15, 16, perpendicular to each other, in depth on the upper wall 4 of said plastic jacket 2.

One 15 of the channels extends from the sidewall 6 to said opposite sidewall 8, the other 16, possibly, of the channels extending from the other sidewall 5 to said opposite sidewall 7. One 16 of the channels furthermore has in depth, a groove for the passage of electrical cables.

According to an embodiment, said lower wall 3 and the upper wall 4 of the plastic jacket 2 are not parallel to each other, mutually inclined by an angle $\alpha$. This angle $\alpha$ can be between 10° and 30° and for example between 10° and 14° (i.e. 12°). This angle $\alpha$ has for function to incline the photovoltaic panel P in relation to the horizontal of said same angle $\alpha$ when the device is resting on a horizontal surface by the intermediary of said lower wall 3. Such an angle $\alpha$ between 10° and 14° is a compromise between the self-cleaning of the panel P, by the trickling of rainwater and the wind load which is minimised.

Figure 2:
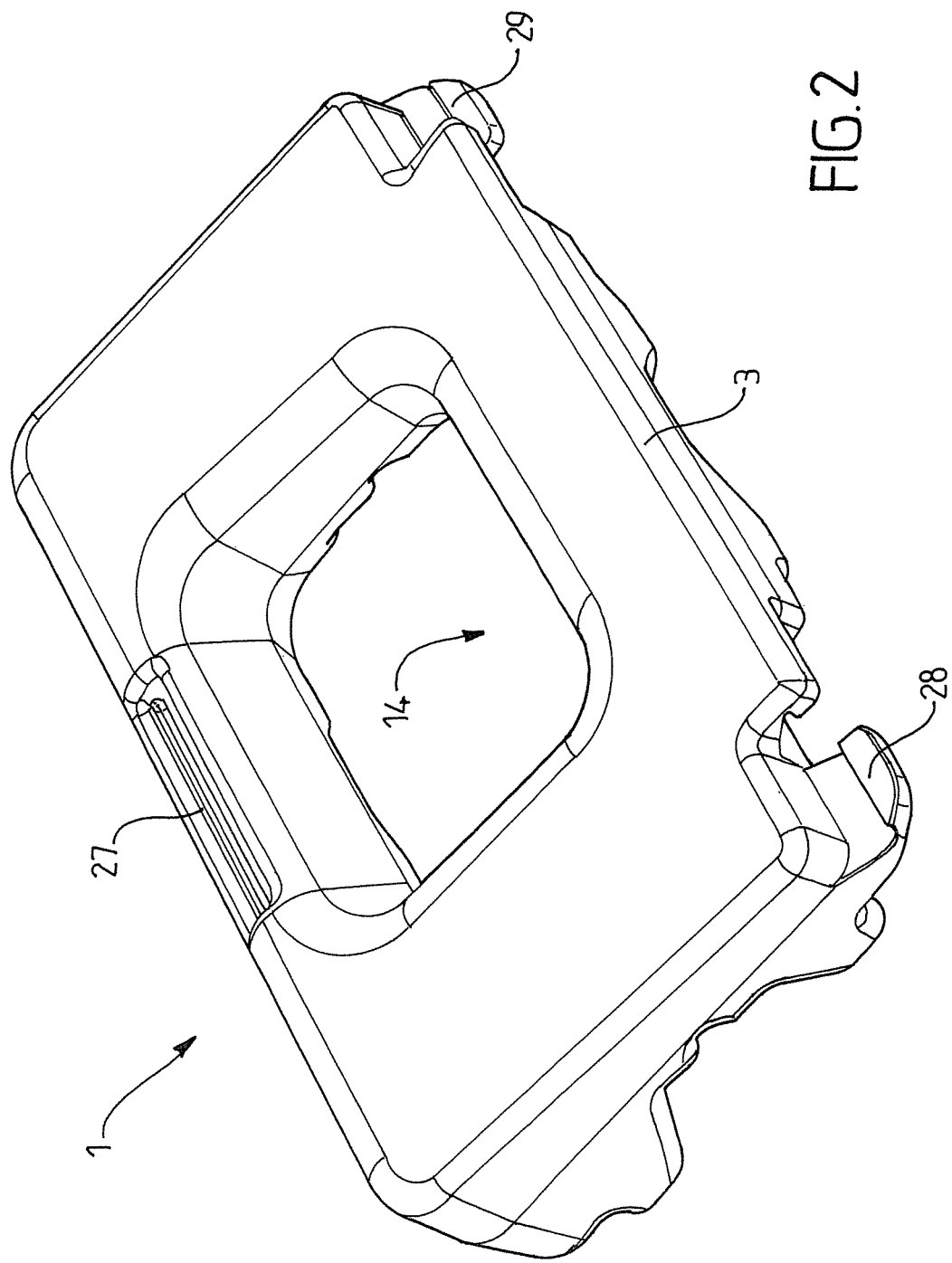
FIG. 2 is a bottom view of the device such as shown in FIG. 1.
Figure 3:
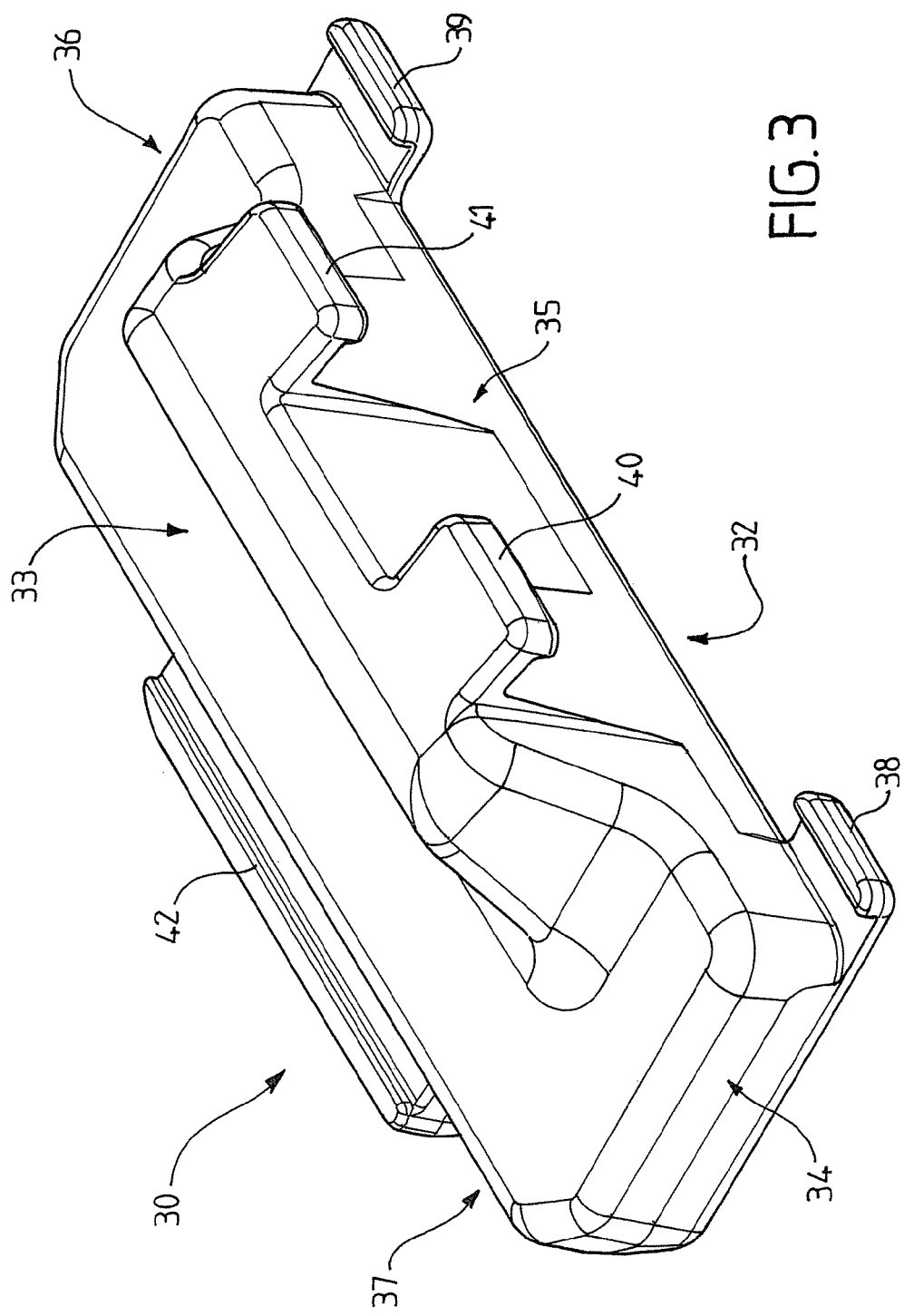
FIG. 3 is a view of a connecting element intended to cooperate with said device such as shown in FIG. 1.

For example, according to the embodiment of FIG. 2 or, when the device 1 is resting on a horizontal surface by the intermediary of said lower wall 3, the upper wall 4 of the plastic jacket 2 has on the one hand, two edges A1, A2, parallel to each other and each inclined by said angle $\alpha$ in relation to the horizontal, whereon are provided the sliding means 10, 11, 12, 13, and on the other hand, two edges A3, A4 parallel to each other, each parallel to the horizontal, of which one A3 is at a higher level authorising the introduction of the photovoltaic panel P, and the other A4 is at a lower level, having said means for abutment 14, 15. According to this embodiment, the natural slope of the device forces the panel P in the direction of the means for abutment 140, 150, under the effect of gravity.

Figure 7:
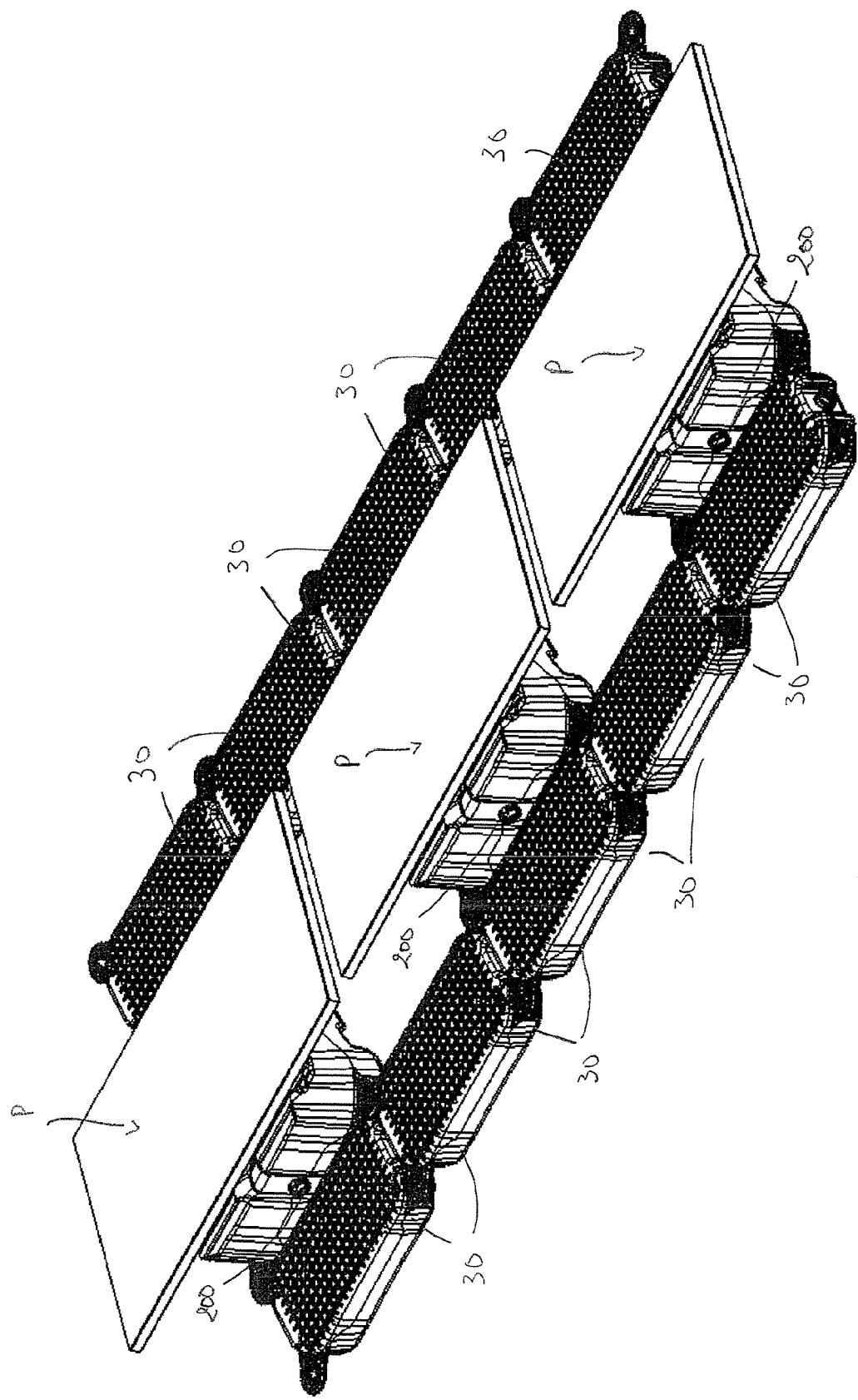
FIG. 7 is a view of the system such as shown in FIG. 6, the photovoltaic panels installed.
Figure 8:
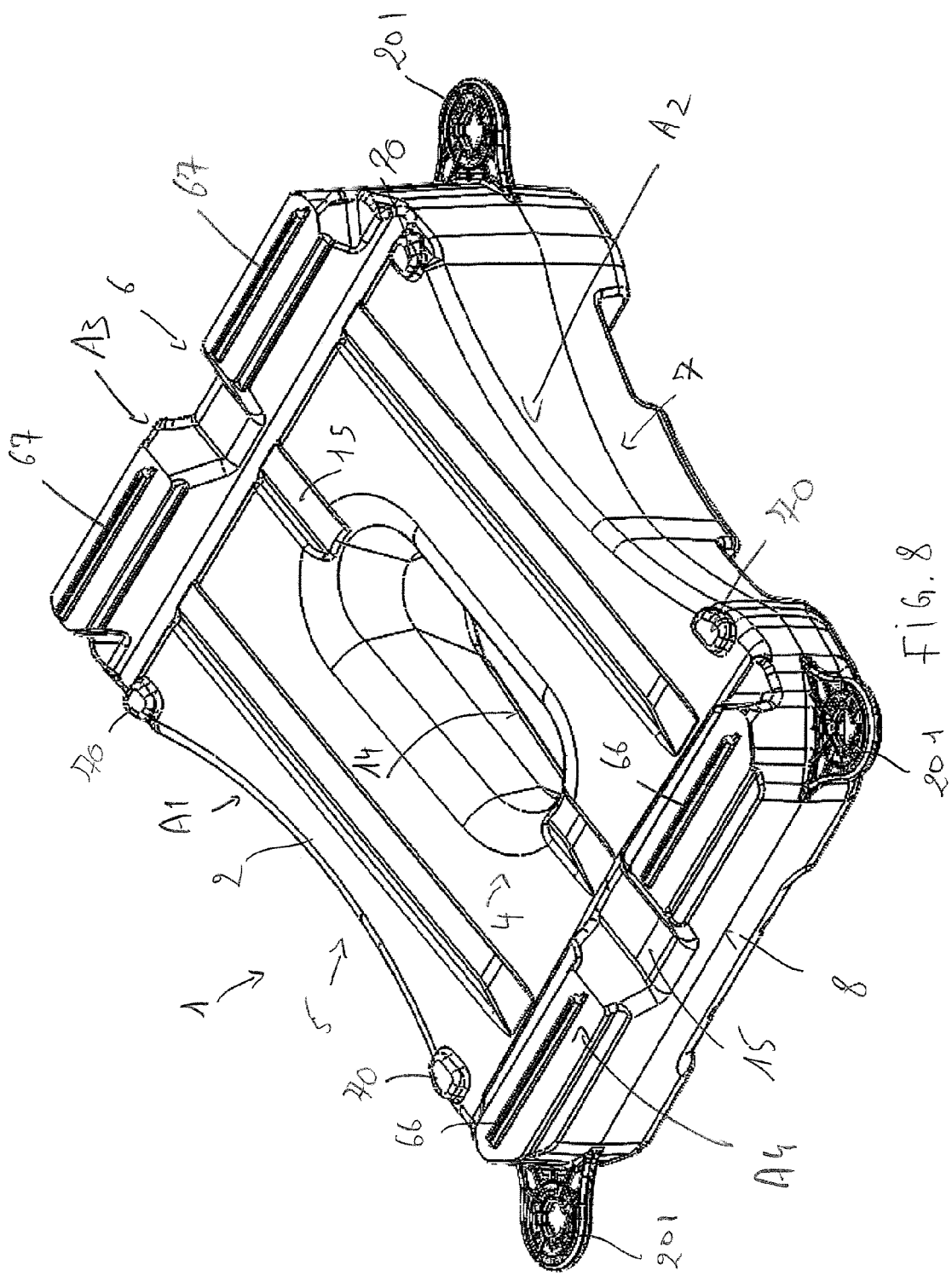
FIG. 8 is a perspective view of a device for supporting a panel of the system as shown in FIG. 6.
Figure 9:
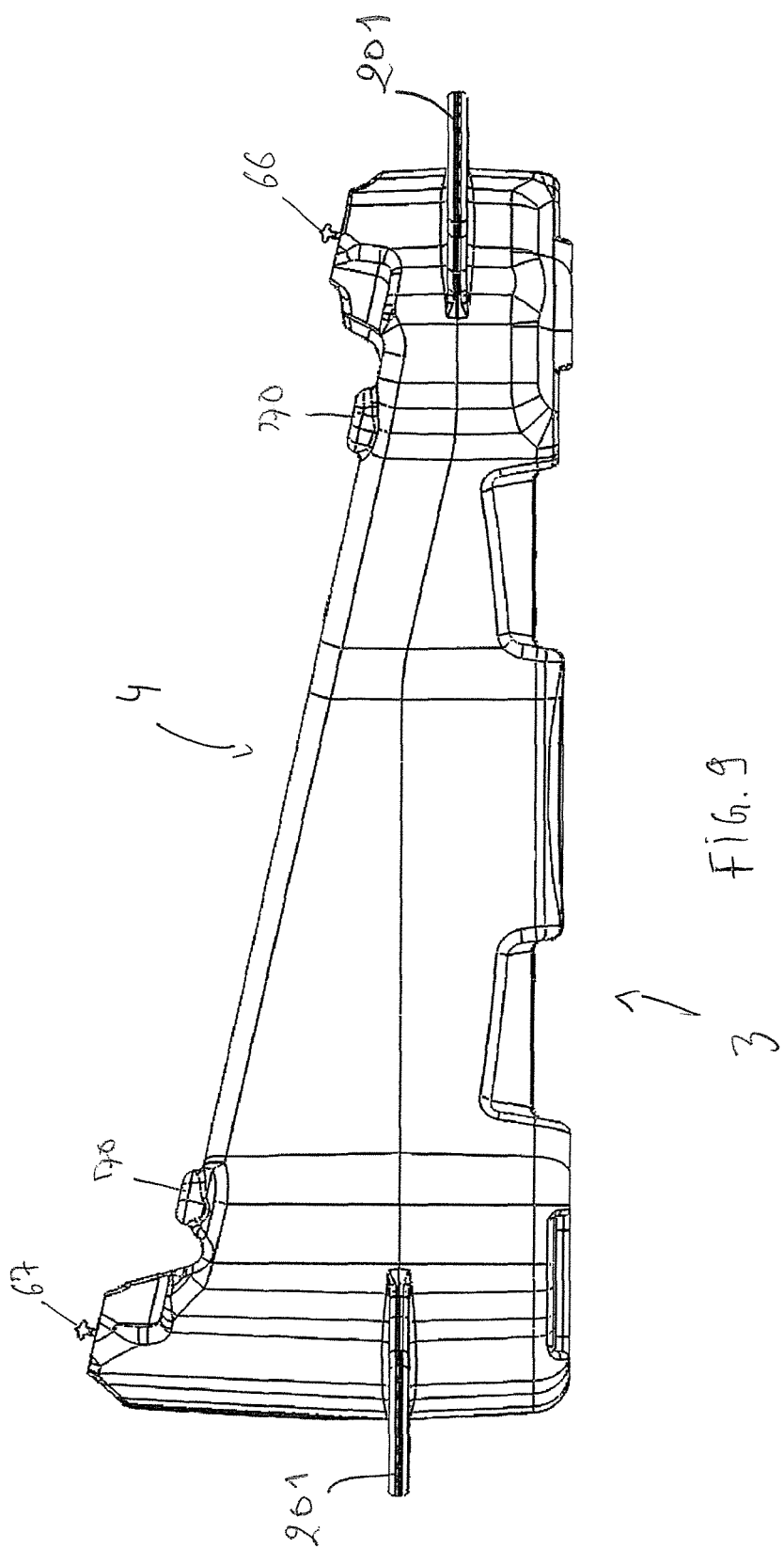
FIG. 9 is a side view of the device such as shown in FIG. 8.
Figure 10:
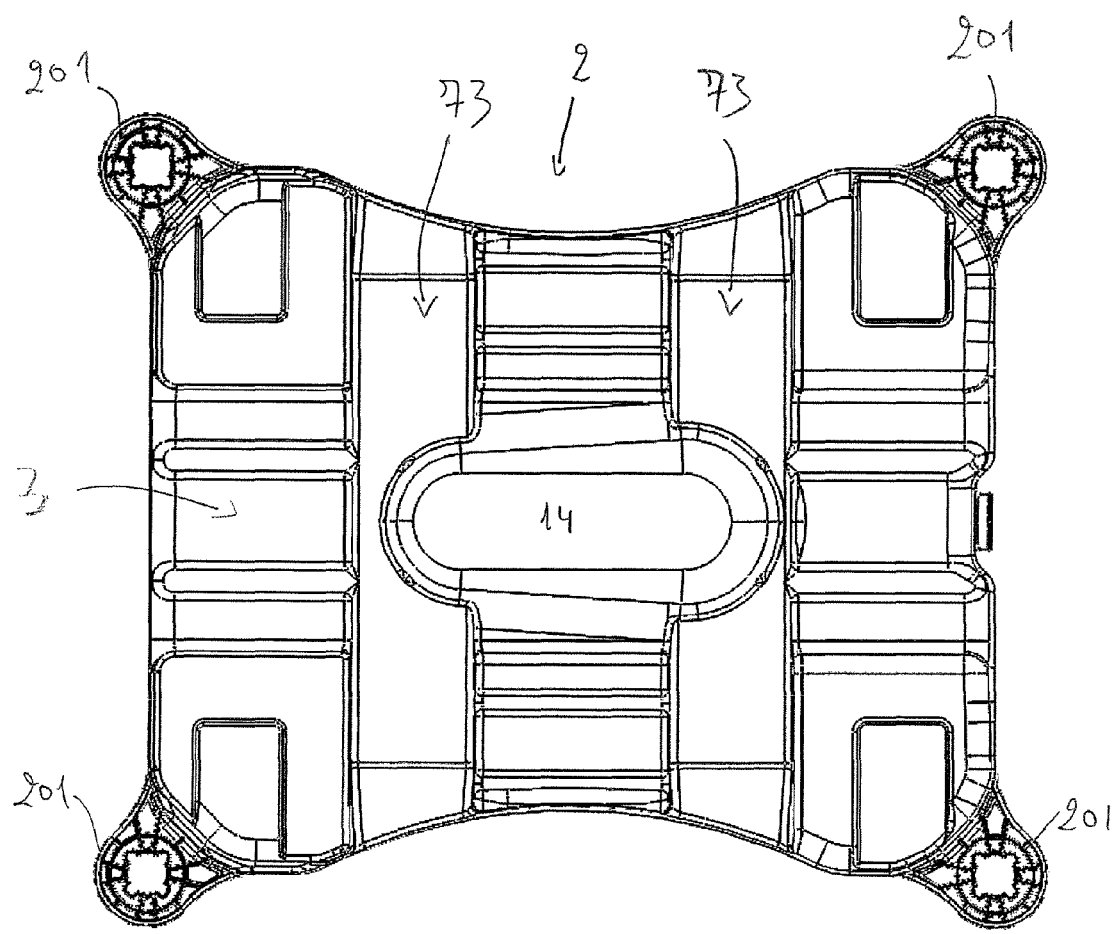
FIG. 10 is a bottom view of the device such as shown in FIG. 8.
Figure 11:
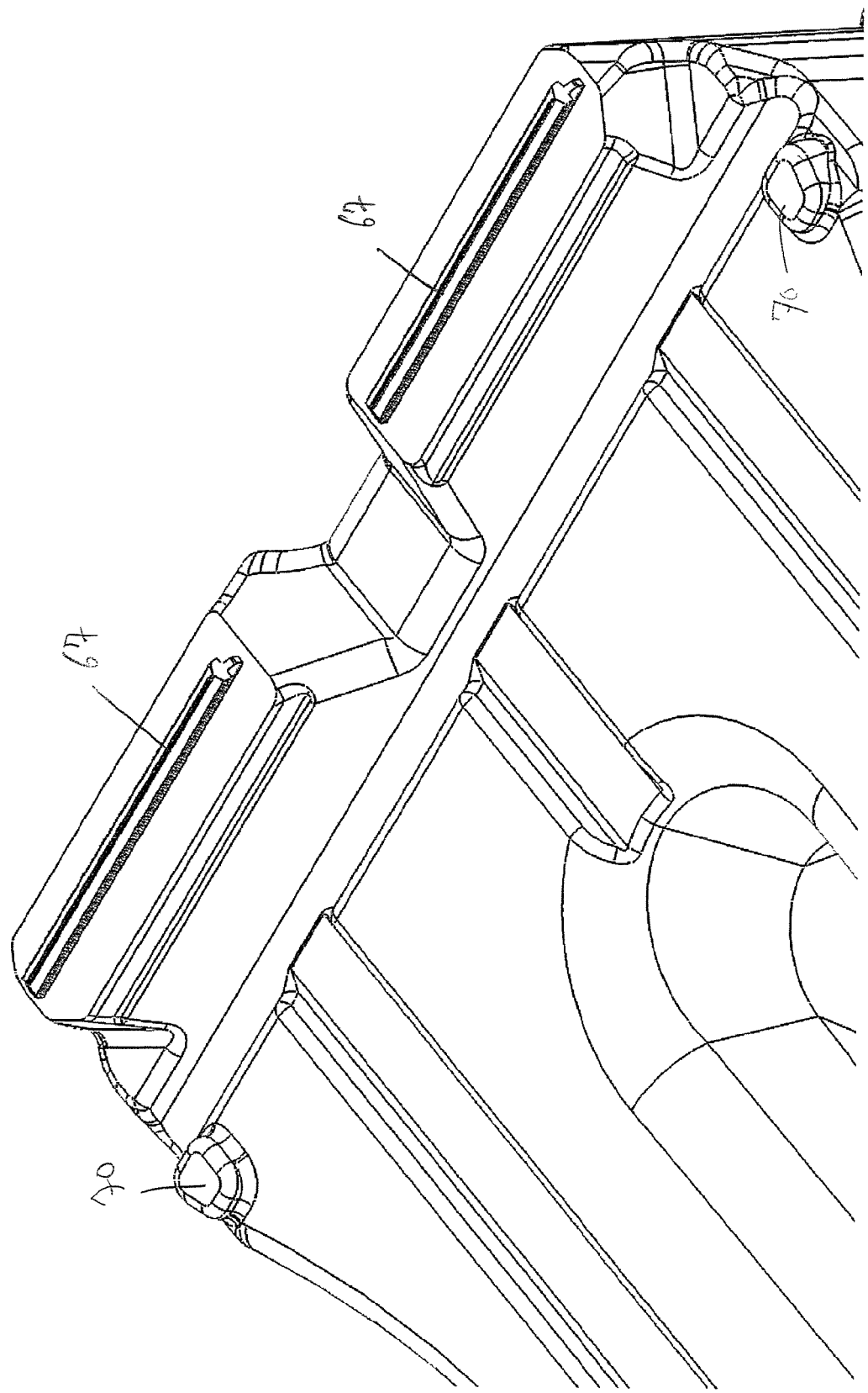
FIG. 11 is a detailed view of the device such as shown in FIG. 8.
Figure 12:
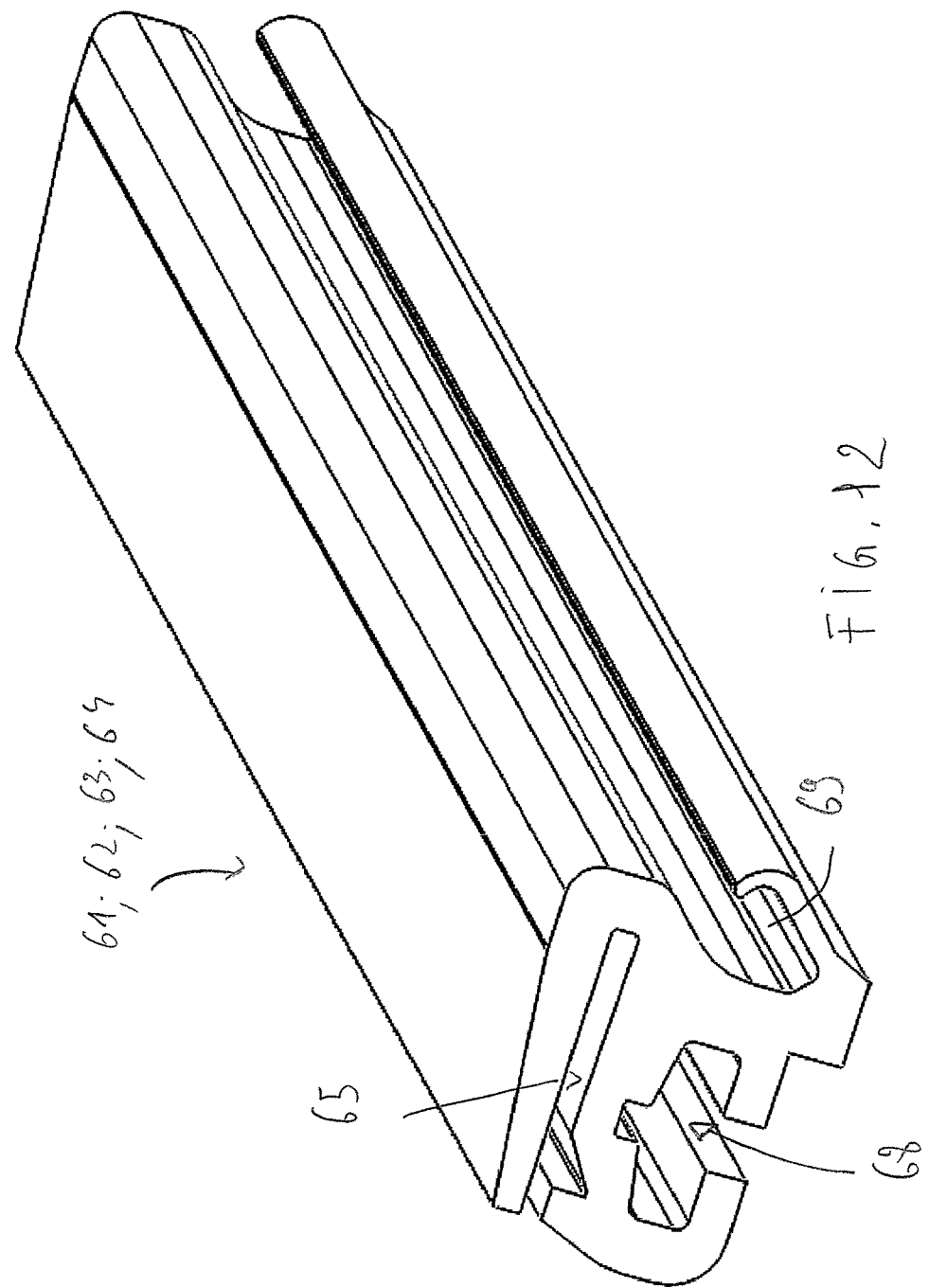
FIG. 12 is a view of an elastomeric fastener (profile) of said means of maintaining.
Figure 13:
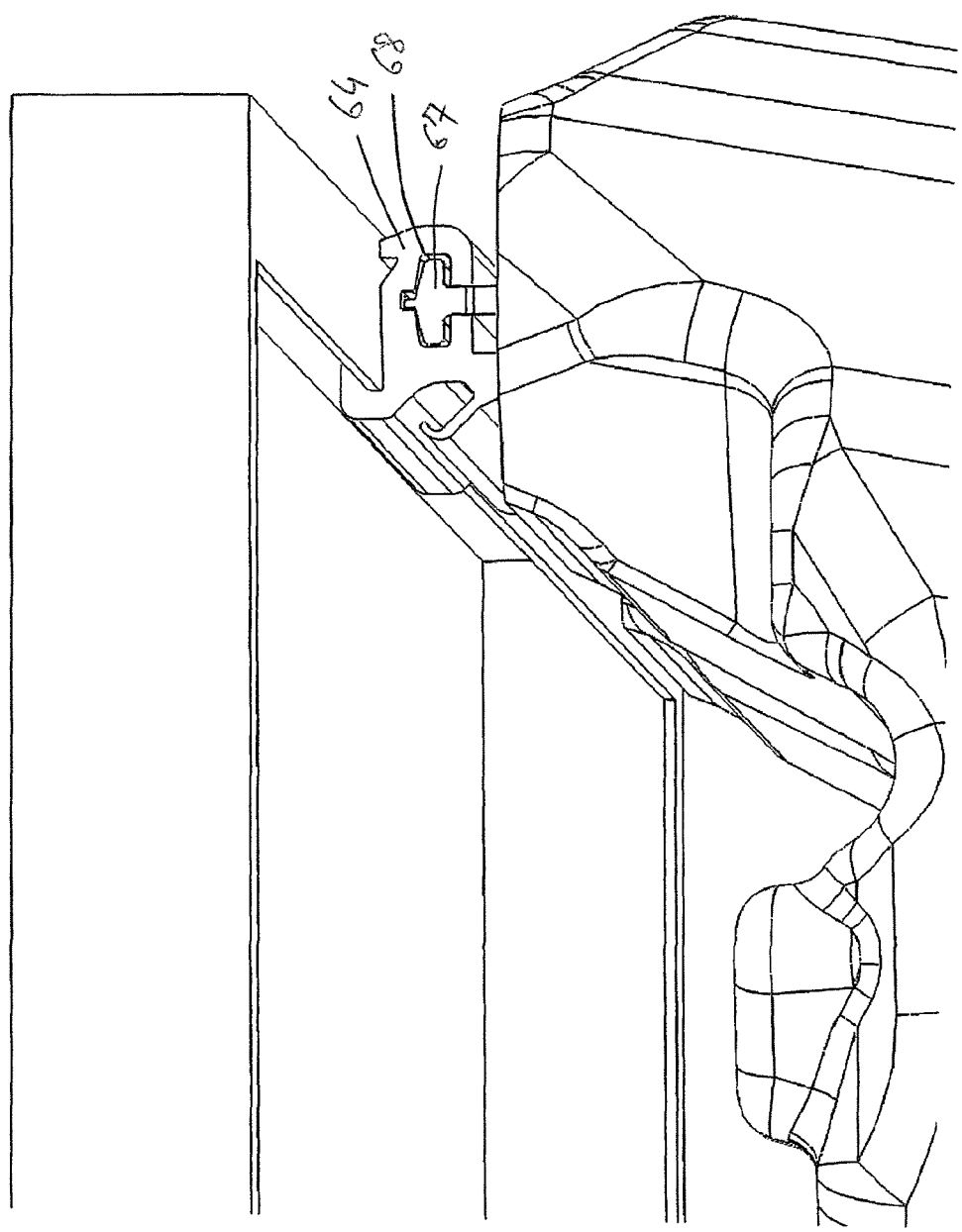
FIG. 13 shows, according to a detailed view, the assembling of the elastomeric fastener on the plastic jacket of the device and it cooperation with the frame of a framed photovoltaic panel.
Figure 14:
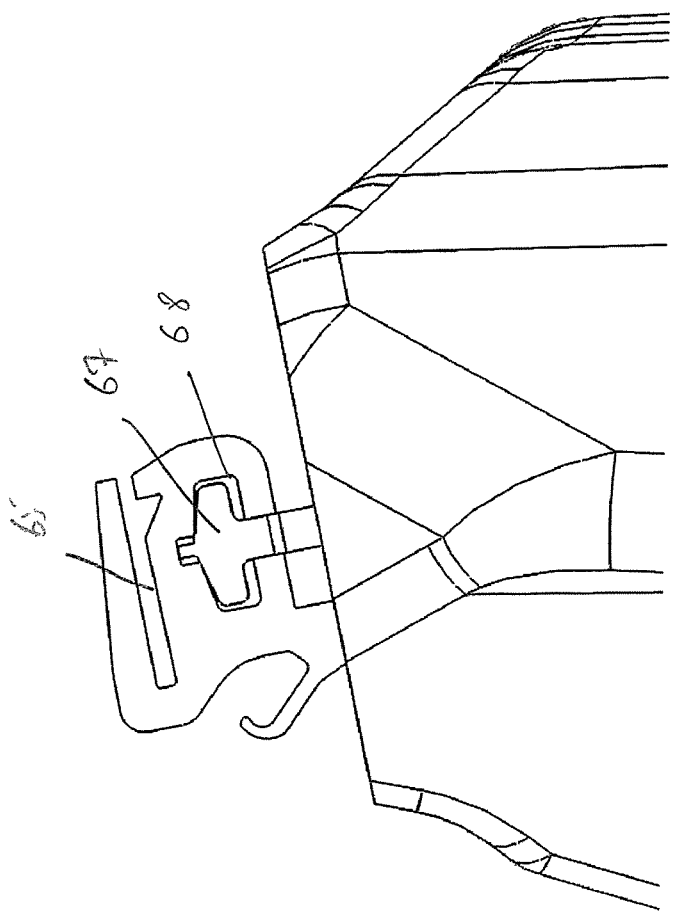
FIG. 14 is a cross-section view illustrating the nesting of the elastomeric fastener profile on a T-shaped groove of the plastic jacket of the device.

According to another example shown in FIG. 8, when the device 1 is resting on a horizontal surface by the intermediary said lower wall 3, the upper wall 4 of the plastic jacket 2 has on the one hand, two edges A1, A2, parallel to each other and each inclined by said angle α in relation to the horizontal, and on the other hand, two edges A3, A4 parallel to one another, each parallel to the horizontal, of which one A3 is at a higher level long which is provided the T-shaped rib 67, and the other A4 is at a lower level, having the other T-shaped rib 66. Such as shown in FIGS. 1 to 5, the device 1 for supporting a panel has an encumbrance substantially equal to the encumbrance of said photovoltaic panel P. According to another example, shown in particular in FIG. 7, the device 1 for supporting a panel and the panel P can have a different encumbrance.

According to an embodiment, said plastic jacket 2 can have protruding fastening lugs 201 on four corners of said plastic jacket 2, respectively located between said sidewalls 5, 6, 7, 8.

Moreover, at least two 5, 7, in particular opposite, of the sidewalls 5, 6, 7, 8 of the plastic jacket 2 can be of concave shape, each said wall 5 or 7 being curved inwards in order to lessen lapping, as such preventing the splashing of water onto the photovoltaic cells.

The invention also relates to a system 50 for supporting photovoltaic panels resulting from the assembly of devices 1 for supporting photovoltaic panels, in accordance with the invention, and of connecting elements 30. The connecting elements 30 allow at least two supporting devices to be connected in accordance with the invention.

Each connecting element is comprised substantially of a sealed plastic jacket 31, said plastic jacket 31 of said connecting element constituting a lower wall 32, an upper wall 33, and four sidewalls 34, 35, 36, 37, said system having means for fastening for the mutual assembly of said connecting elements 30 and of said devices 1 in accordance with the invention.

Said plastic jacket 31, has an interior volume, able to enclose a volume of air, making it possible to ensure the floating of said connecting element. This plastic jacket 31 can have an opening 301 closed by a plug, in order to change the conditions of floating or to ballast the device.

This plastic jacket 31 can be manufactured by roto-moulding or by the techniques of extrusion blow-moulding. For example, said system 50 has at least two rows R1, R2 of devices 1 for supporting photovoltaic panels in accordance with the invention. Each row is comprised of devices arranged, in particular side by side by the intermediary of their sidewalls 5, 7.

Said two rows R1, R2 of devices 1 are maintained by means of a row R3 of connecting elements 30, arranged side by side, by the intermediary of their sidewalls 34, 36, able to constitute a maintenance corridor for a user. The upper wall 33 of said connecting element may not be smooth, having, in particular embossed, striated in order to prevent this surface from being too slippery when walked on.

The row R3 of connecting elements 30 is a spacer row allowing the separation of the two rows R1, R2 of photovoltaic panels preventing the panel of a row R1 from casting a shadow on the panel of a successive row R2.

According to an embodiment, the means for fastening include said fastening lugs 201 of the plastic jacket 2 of the devices 1 for supporting a panel, as well as fastening lugs 301 of the plastic jacket 31 of the connecting elements 30, as well as pins (not shown), each pin being intended to simultaneously pass through two, or even three or four lugs set against each other in order to provide for the locking of the assembly.

According to an embodiment, the connecting element 31 is substantially of rectangular parallelepiped shape and comprises four fastening lugs at its four corners 301. The large side of the parallelepiped is substantially of dimension equal to the dimension in length of two 6, 8 of the sidewalls of the jacket 2 of the device.

Two consecutive connecting elements 30 belonging to the same row R3 are side by side, in particular via their small size, in particular fastened to one another by the setting against, two by two, of four lugs.

Figure 6:
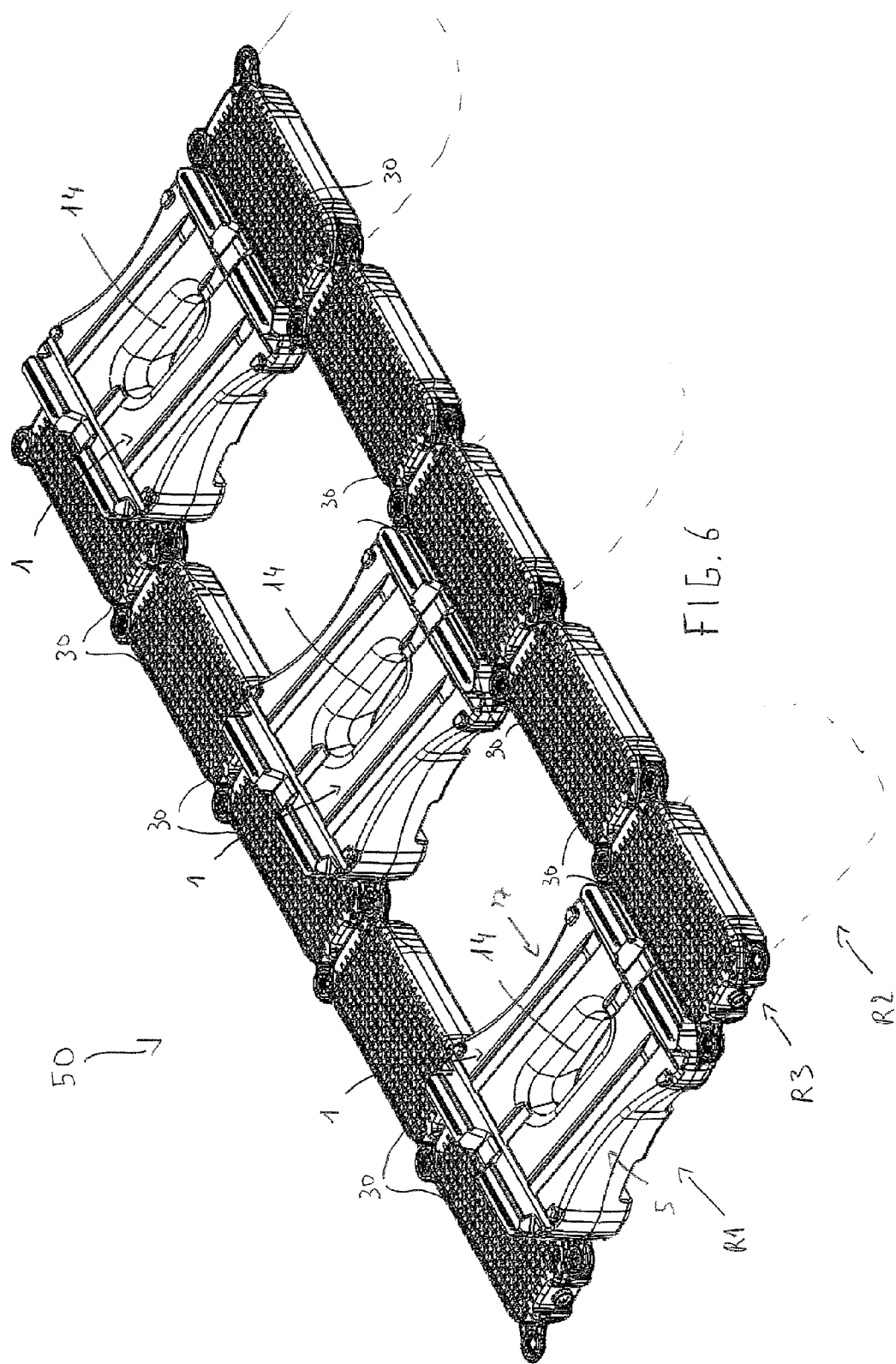
FIG. 6 is a view of a system for supporting photovoltaic panels in accordance with the invention according to a second embodiment (panels removed)

According to a non-restricted embodiment shown in FIG. 6, two consecutive supporting devices 1 belonging to the same row R1 can be separated mutually by means of a connecting element 30, or even two connecting elements 30 in parallel, spacing the two devices 1. As such and in the case of FIG. 6 and on the row R3 one connecting element 30 out of two makes it possible to space the devices 1.

According to another embodiment, the means for fastening are comprised by means of clipping that are mutually engaging between each supporting device 1, in accordance with the invention, and each connecting element 30. Advantageously, said means of clipping are comprised of first plastic elements 23, 24, 25, 26, 27, 28, 29, all in one piece with said plastic jacket 2 of said device 1 in accordance with the invention and of second plastic elements 38, 39, 40, 41, 42 all in one piece with said plastic jacket 31 of said connecting element 30.

For example, said first plastic elements 23, 24, 25, 26, 27, 28, 29, are formed on two sidewalls 6, 8 of the plastic jacket 2 of the device. Said second plastic elements 38, 39, 40, 41, 42 are formed on two sidewalls 35, 37 of the plastic jacket 31 of the connecting element 30.

During the assembly, said connecting element 30 is arranged as overlapping of two supporting devices 1 in accordance with the invention, said two contiguous devices 1 belonging to the same row R1. Said connecting element is then fastened to said two contiguous devices by the intermediary of said means for fastening.

Figure 4:
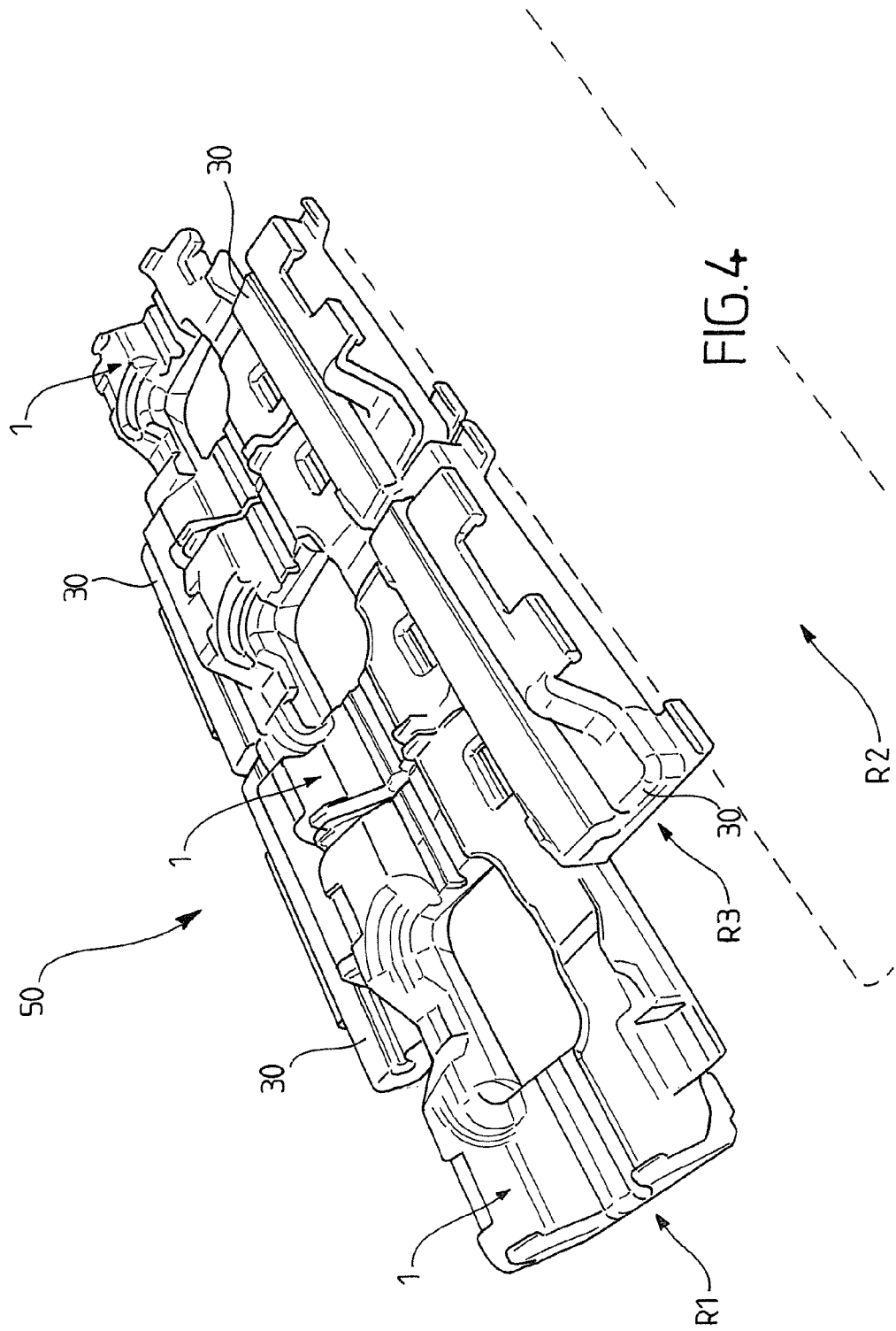
FIG. 4 is a view of the system for supporting photovoltaic panels resulting from the assembly of devices such as shown in FIG. 1 and of connecting elements such as shown in FIG. 3 (photovoltaic panels not shown)
Figure 5:
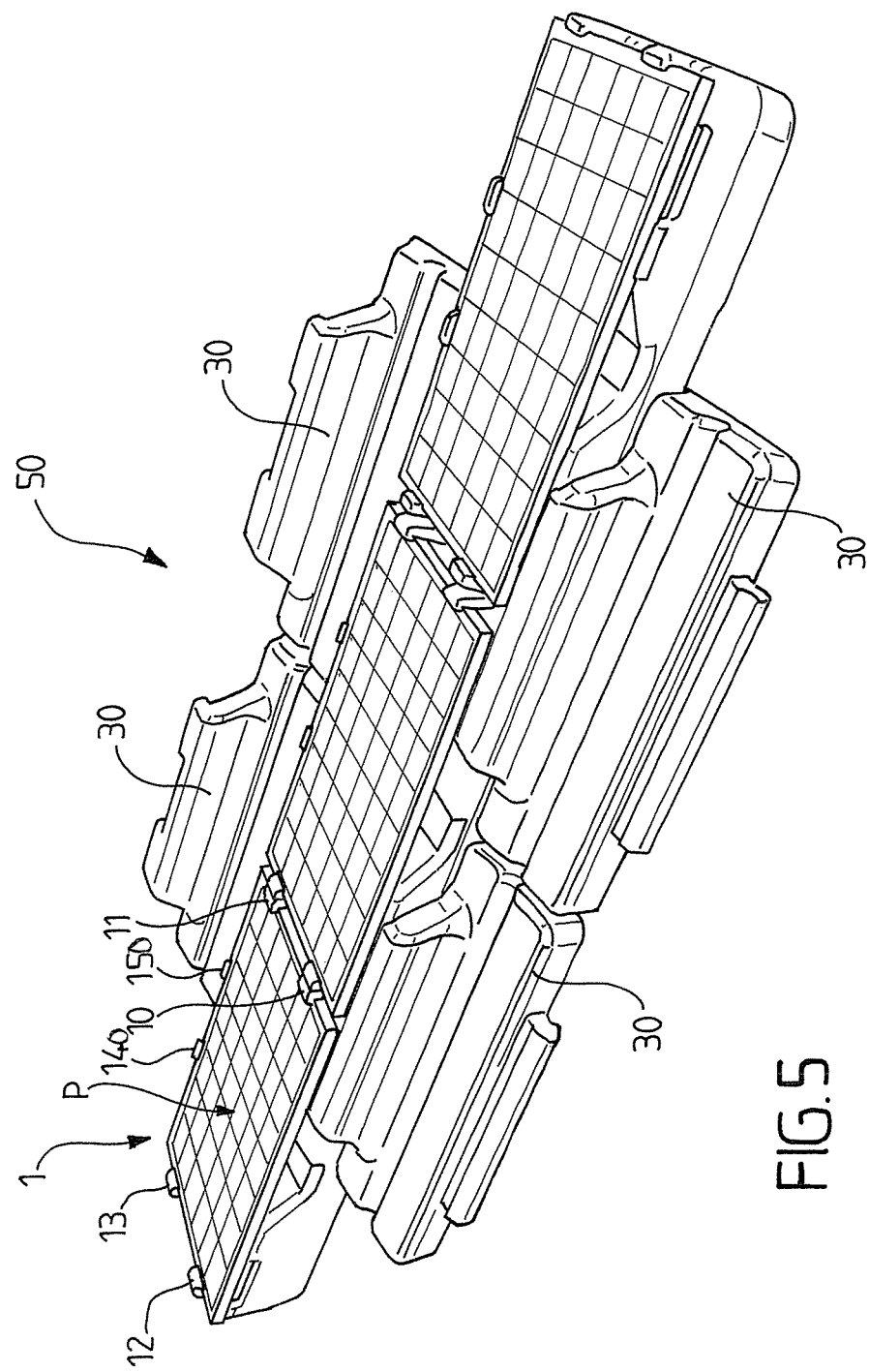
FIG. 5 is a view of the system such as shown in FIG. 4 (photovoltaic panels shown)

Such as shown in FIG. 4, the two male plastic portions 41, 39, of the sidewall 35 of said connecting element 30 come to be force fitted into the female portions 25, 27, of the sidewall 6 of a supporting device 1 and the two male plastic portions 38, 40, of the sidewall 35 of said connecting element 30 come to be fitted into the portions 26, 27 of the sidewall 6 of the contiguous device 1.

On the other side of said connecting element 30, the male portion 42, of the sidewall 37 of said connecting element 30 comes to be force fitted into the female portion 23 of the sidewall 8 of a device 1 of a successive row and in the female portion 24 of the sidewall 8 of a contiguous device 1 on the same row.

Used on the water, the floating system 50, can be anchored to the bottom by any suitable means, for example by means of anchoring cables fastened to the bottom, or by means of anchoring piles.

Such a system 50 and/or device 1 also has an application in the carrying out of photovoltaic installations on moving terrain, such as for example the terrain of a waste dump, on the ground, in a floodable zone or on roofs.

The plastic jackets 2 of the devices 1 and the plastic jackets 31 of the connecting elements 30 can, according to the embodiment of FIGS. 7 to 18, during the transport, and such as shown in FIG. 19 be assembled two by two in order to form a block, substantially parallelepiped, easily transportable. The assembly is constituted by the fitting of two plastic jackets 2 of the devices 1 and of two plastic jackets 31 of the connecting elements, with the latter sandwiched between the two plastic jackets 2. To this effect, the two upper walls 4 of the jackets 2 are turned towards each other. The maintaining of the assembly can be facilitated by means of studs 70 (FIG. 8) on the upper wall 4 of the jacket 2 of the devices 1 and intended to engage with complementary cavities 71 (FIG. 17) of the plastic jackets 31 of the connecting elements 30. Two wide grooves 73, parallel to one another on the lower wall 3 of the jacket of the device 1 can allow for the passage of the two arms of a fork of a lift truck, under the block (i.e. three palettes), or even facilitate the strapping of the assembly by means of one or several ties, running along the grooves 73.

Naturally, other embodiments could have been considered by those skilled in the art without however leaving the scope of the invention defined by the claims hereinafter.

NOMENCLATURE

1. Panel supporting device,
2. Plastic jacket,
3. Lower wall,
4. Upper wall,
5, 6, 7, 8 Sidewalls,
10, 11, 12, 13 Sliding means
140, 150 Means for abutment,
P photovoltaic panel,
A1, A2, A3, A4 upper wall edges,
14 Recess,
15, 16 Channel in depth on the upper wall,
30 Connecting element,
31 Plastic jacket,
32 Lower wall,
33 Upper wall,
34, 35, 36, 37 sidewalls,
R1, R2 Rows of panel supporting devices,
23, 25, 26, 27, 28, 29 First plastic elements (Means of clipping device 1),
38, 39, 40, 41, 42 Second plastic elements (Connecting element 30),
50 System for supporting photovoltaic panels,
61, 62; 63; 64 Elastomeric fastener profiles,
65 Longitudinal slots,
66, 67 Fastening ribs (Plastic jacket 2),
68 Complementary groove (Fastening profile),
70 Studs, 71 Complementary cavities (Studs 70),
200 Opening (Plastic jacket 2),
201 Fastening lugs (Plastic jacket 2),
300 Opening (Plastic jacket 31),
301 Fastening lugs (Plastic jacket 31)

The invention claimed is:

1. A device (1) for supporting a photovoltaic panel comprised substantially of a sealed plastic jacket (2), said plastic jacket (2) constituting a lower wall (3), an upper wall (4), and four sidewalls (5, 6, 7, 8), said plastic jacket (2) being able to enclose a volume of air allowing it to constitute a floater, with the device having means for maintaining a photovoltaic panel on said upper wall (4) of said plastic jacket, wherein said means for maintaining include two elastomeric profiles (61, 62; 63; 64), fastened to said plastic jacket (2), said two fastener profiles (61, 62; 63; 64) extending parallel to each other, each of the fastener profiles having a longitudinal slot (65) intended for the pinching of the frame (C) of a framed photovoltaic panel, or, intended for the pinching of a frameless photovoltaic panel, said longitudinal slots (65) of the two fastening profiles extending according to the same plane parallel to the plane of the photovoltaic panel, said two fastener profiles (61, 62; 63; 64) being separated mutually in such a way as to allow for the fastening of a framed photovoltaic panel by pinching of two opposite edges (C1, C2) of the frame, or the fastening of a frameless photovoltaic panel, by pinching of two edges of the photovoltaic panel.

2. The device according to claim 1, wherein each elastomeric fastener profile (61, 62;
   63; 64) comprises a groove of a shape complementary to a rib (66;
   67) for fastening said plastic jacket (2) of the device (1), said fastener profile being made integral with said plastic jacket (2) by slipping the fastening rib into said complementary groove (68) of the elastomeric fastener profile.

3. A device (1) for supporting a photovoltaic panel comprised substantially of a sealed plastic jacket (2), said plastic jacket (2) constituting a lower wall (3), an upper wall (4), and four sidewalls (5, 6, 7, 8), said plastic jacket (2) being able to enclose a volume of air allowing it to constitute a floater, with the device having means for maintaining a photovoltaic panel on said upper wall (4) of said plastic jacket,
   wherein said plastic jacket (2) has:
   a recess (14) intended for the aeration of said photovoltaic panel, said recess (14) passing through said plastic jacket (2) from said upper wall (4) to said lower wall (3) and/or
   at least one channel (15, 16), extending in depth over the upper surface (4), intended for the aeration of said photovoltaic panel, said at least one channel (15, 16) extending from a sidewall of said plastic jacket (2) to the opposite sidewall of said plastic jacket.

4. The device according to claim 3, wherein said lower wall (3) and the upper wall (4) are not parallel to each other, and are mutually inclined by an angle α, said angle α being between 10° and 30° in such a way as to incline the photovoltaic panel P in relation to the horizontal of said same angle α when the device is resting on a horizontal surface by the intermediary of said lower wall (3).

5. The device according to claim 3, wherein said plastic jacket (2) of said device (1) has an opening (200) closed by a plug, making it possible to partially fill the interior volume of the plastic jacket (2).

6. The device according to claim 3, wherein said plastic jacket (2) has fastening lugs (201) on four corners of said plastic jacket (2).

7. The device according to claim 3, wherein at least two (5, 7) of the sidewalls (5, 6, 7, 8) of the plastic jacket (2) are of concave shape.

8. The device according to claim 3, comprising said recess (14) intended for the aeration of said photovoltaic panel, said recess (14) passing through said plastic jacket (2) from said upper wall (4) to said lower wall (3).

9. The device according to claim 3, comprising said at least one channel (15, 16), extending in depth over the upper surface (4), intended for the aeration of said photovoltaic panel, said at least one channel (15, 16) extending from a sidewall of said plastic jacket (2) to the opposite sidewall of said plastic jacket.

10. The device according to claim 3, comprising both:
    said recess (14) intended for the aeration of said photovoltaic panel, said recess (14) passing through said plastic jacket (2) from said upper wall (4) to said lower wall (3), and
    said at least one channel (15, 16), extending in depth over the upper surface (4), intended for the aeration of said photovoltaic panel, said at least one channel (15, 16) extending from a sidewall of said plastic jacket (2) to the opposite sidewall of said plastic jacket.

11. The device according to claim 3, wherein said plastic jacket (2) is an extrusion blown molded jacket.

12. The device according to claim 3, wherein said plastic jacket (2) is a roto-molded jacket.

13. A system (50) for supporting photovoltaic panels resulting from the assembly of devices (1) for supporting photovoltaic panels and of connecting elements (30), each said device (1) for supporting a photovoltaic panel comprising substantially of a sealed plastic jacket (2), said plastic jacket (2) constituting a lower wall (3), an upper wall (4), and four sidewalls (5, 6, 7, 8), said plastic jacket (2) being able to enclose a volume of air allowing it to constitute a floater, with the device having means for maintaining a photovoltaic panel on said upper wall (4) of said plastic jacket, and each connecting element being constituted substantially by a sealed plastic jacket (31), said plastic jacket (31) of said connecting element constituting a lower wall (32), an upper wall (33), and four sidewalls (34, 35, 36, 37), said plastic jacket (31) having an interior volume allowing the floating of said connecting element (30) to be ensured, said system having means for fastening for the assembly together of said connecting elements (30) and of said devices (1).

14. The system according to claim 13 wherein the means for fastening include fastening lugs (201) of the plastic jacket (2) of the devices (1), as well as fastening lugs (301) of the plastic jacket (31) of the connecting elements (30), as well as pins, each pin being intended to simultaneously pass through two, or even three or four lugs set against each other in order to provide for the locking of the assembly.

15. The system according to claim 13, having at least two rows (R1, R2) of devices, said two rows (R1, R2) of devices (1) being maintained by means of a spacer row (R3) of connecting elements (30), able to constitute a maintenance corridor.

16. The system according to claim 15, wherein two consecutive supporting devices (1) belonging to the same row (R1) are separated mutually by a connecting element (30), or even two connecting elements (30) in parallel, spacing the two devices (1).

17. The system according to claim 13, wherein the devices (1) for supporting photovoltaic panels and the connecting elements (30) are modular elements.

18. The system according to claim 13, wherein the plastic jacket (31) of each of said connecting elements (30) has an opening (300) closed by a plug.

19. The system according to claim 13, wherein said plastic jacket (2) of each device has:

a recess (14) intended for the aeration of said photovoltaic panel, said recess (14) passing through said plastic jacket (2) from said upper wall (4) to said lower wall (3) and/or at least one channel (15, 16), extending in depth over the upper surface (4), intended for the aeration of said photovoltaic panel, said at least one channel (15, 16) extending from a sidewall of said plastic jacket (2) to the opposite sidewall of said plastic jacket.

20. The system according to claim 19, comprising said recess (14) intended for the aeration of said photovoltaic panel, said recess (14) passing through said plastic jacket (2) from said upper wall (4) to said lower wall (3).

21. The system according to claim 19, comprising said at least one channel (15, 16), extending in depth over the upper surface (4), intended for the aeration of said photovoltaic panel, said at least one channel (15, 16) extending from a sidewall of said plastic jacket (2) to the opposite sidewall of said plastic jacket.

22. The system according to claim 19, comprising both:
said recess (14) intended for the aeration of said photovoltaic panel, said recess (14) passing through said plastic jacket (2) from said upper wall (4) to said lower wall (3) and, said at least one channel (15, 16), extending in depth over the upper surface (4), intended for the aeration of said photovoltaic panel, said at least one channel (15, 16) extending from a sidewall of said plastic jacket (2) to the opposite sidewall of said plastic jacket.

23. The system according to claim 13, wherein said lower wall (3) and the upper wall (4) of said plastic jacket (2) or each device (1) are not parallel to each other, and are mutually inclined by an angle $\alpha$, said angle $\alpha$ being between 10° and 30° in such a way as to incline the photovoltaic panel P in relation to the horizontal of said same angle $\alpha$ when the device is resting on a horizontal surface by the intermediary of said lower wall (3).

24. The system according to claim 13, wherein said plastic jacket (2) of said device (1) has an opening (200) closed by a plug, making it possible to partially fill the interior volume of the plastic jacket (2).

25. The system according to claim 13, wherein at least two (5, 7) of the sidewalls (5, 6, 7, 8) of the plastic jacket (2) are of concave shape.

26. The system according to claim 13, wherein said plastic jacket (2) of said device (1) is an extrusion blown molded jacket.

27. The system according to claim 13, wherein said plastic jacket (2) of said device (1) is a roto-molded jacket.

* * * * *